E. H. CHANDLER.
GEARING FOR SAWMILLS.
APPLICATION FILED MAR. 27, 1908.
946,335.
Patented Jan. 11, 1910.
2 SHEETS—SHEET 2.
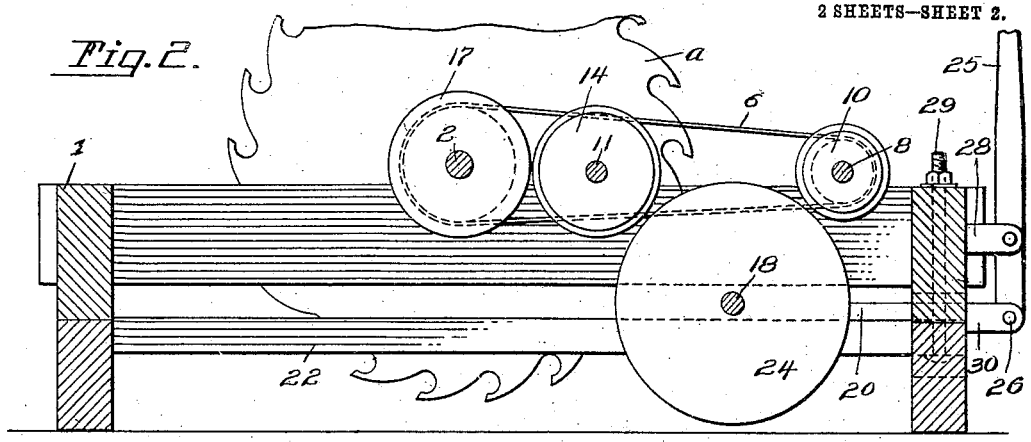
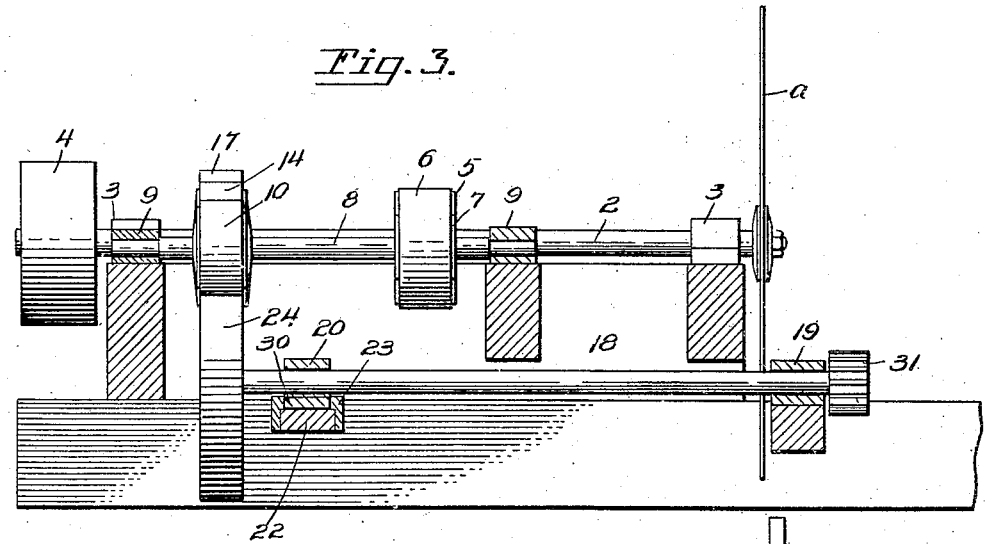
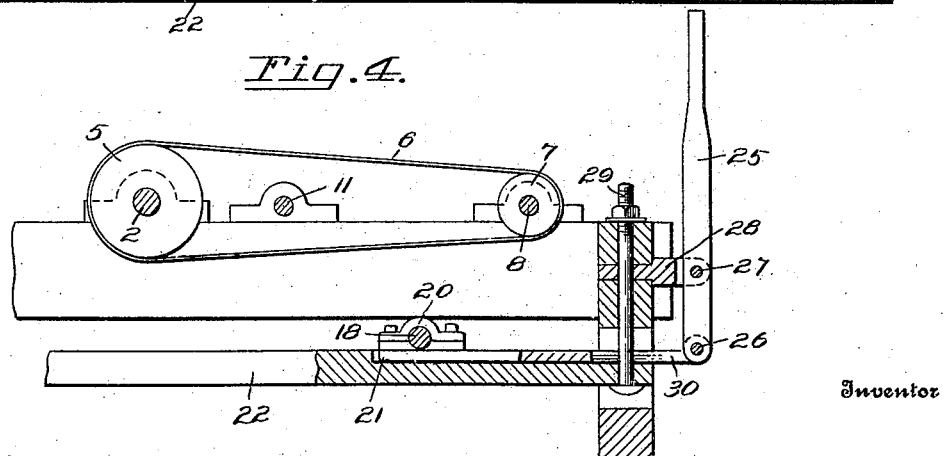
Witnesses
F. C. Gibson.
Inventor
Emanuel H. Chandler.
By Victor J. Evans
Attorney

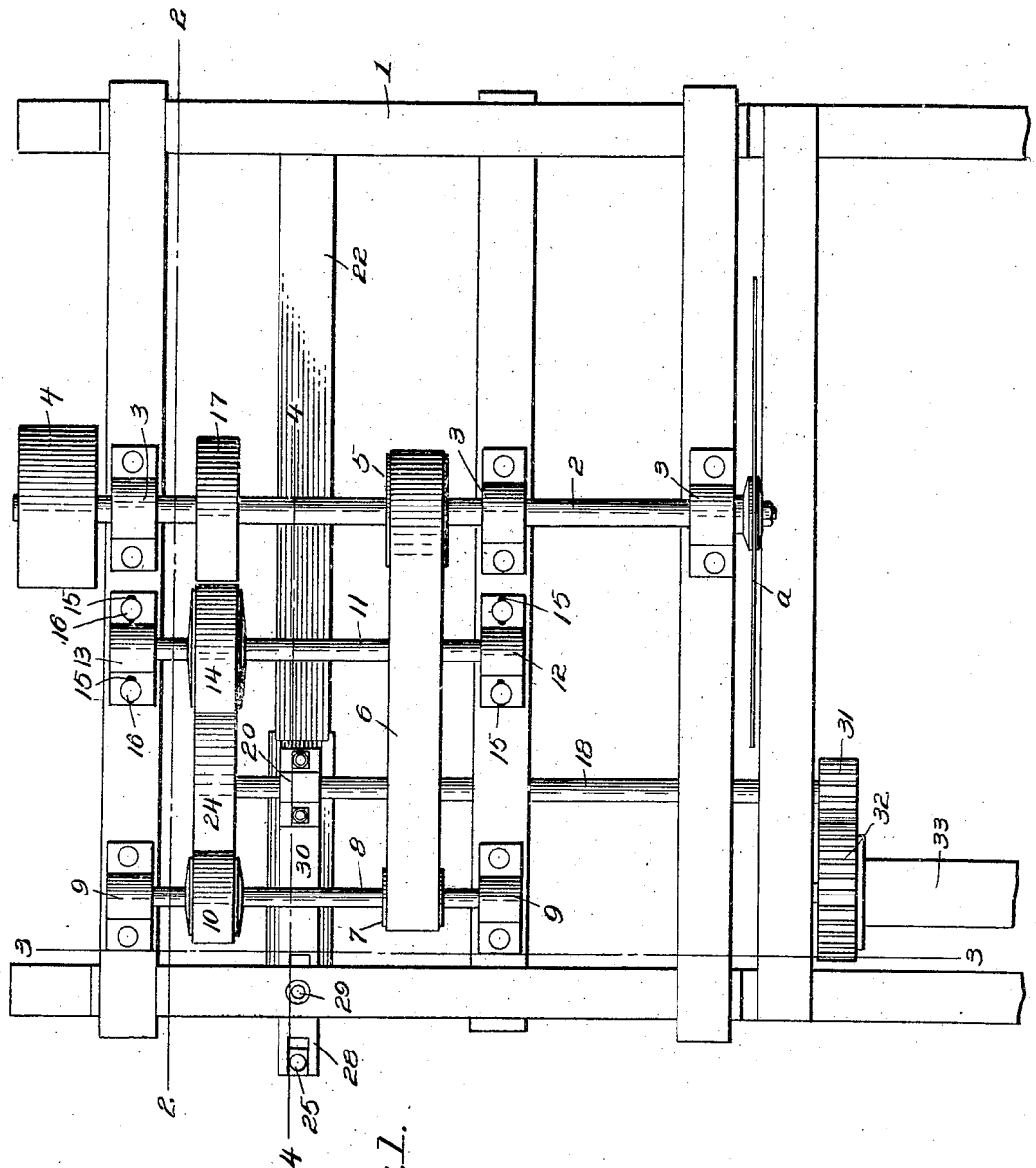

UNITED STATES PATENT OFFICE.

EMANUEL HICKMAN CHANDLER, OF BROOKHAVEN, MISSISSIPPI.

GEARING FOR SAWMILLS.

946,335.  Specification of Letters Patent. Patented Jan. 11, 1910.

Application filed March 27, 1908. Serial No. 423,661.

*To all whom it may concern:*

Be it known that I, EMANUEL HICKMAN CHANDLER, a citizen of the United States of America, residing at Brookhaven, in the county of Lincoln and State of Mississippi, have invented new and useful Improvements in Gearing for Sawmills, of which the following is a specification.

This invention relates to gearing for saw mills, and one of the principal objects of the same is to provide simple and efficient means for quickly moving and reversing the log carriage.

Another object of the invention is to provide simple and improved means for shifting a friction wheel into contact with a pair of pulleys, one of which is rotated in one direction and the other in the opposite direction so that the pinion carried by the shaft of the friction wheel may be rotated in either direction, depending upon which one of the pulleys said friction wheel is thrown into contact with to move the log carriage in one direction or the other.

These and other objects may be attained by means of the construction illustrated in the accompanying drawing, in which,—

Figure 1 is a plan view of a saw mill made in accordance with my invention. Fig. 2 is a longitudinal section view on the line 2—2 of Fig. 1. Fig. 3 is a transverse sectional view on the line 3—3 of Fig. 1. Fig. 4 is a longitudinal section on the line 4—4 of Fig. 1.

Referring to the drawing for a more specific description of my invention, the numeral 1 designates the saw frame in which is mounted the driving shaft or saw arbor 2 journaled in boxes 3 at the top of the frame. On the end of the driving shaft 2 is a driving pulley 4, and intermediate the ends of said shaft is a pulley 5 which is connected by a belt 6 to a small pulley 7 on a transmission shaft 8 journaled in boxes 9 at the top of the frame 1. The shaft 8 is provided with a pulley 10. An intermediate shaft 11 mounted in bearings 12 and 13 on the frame 1 is provided with a friction pulley 14. The bearings 12 and 13 are provided with slots 15, and the shaft 11 is thus adjustable. On the driving shaft 2 is a friction pulley 17. A driven shaft 18 is mounted in a bearing 19 underneath the top bars of the frame and at one side thereof, the opposite end of said shaft being mounted in a slide 20 mounted in a guide groove 21 formed in a bar 22. Secured to opposite sides of the bar 22 are cleats 23 which aid in forming a guideway for the slide 20. On the inner end of the shaft 18 is a large friction wheel 24 which is adapted to be thrown into contact with the pulley 14 when it is desired to be rotated in one direction and thrown into contact with the pulley 10 when it is desired to rotate the said friction wheel 24 in the opposite direction. Connected to the slide 20 is a lever 25 pivoted at 26 to the slide 20 and fulcrumed at 27 upon a bracket 28 secured to the frame 1. An adjusting bolt 29 extends through the bars of the frame at one end thereof, said bolt serving to hold the bracket 28 in place, and the head of said bolt bearing against the underside of the bar 22, while the body of the bolt passes through a slot 30 in the slide 20. On the outer end of the shaft 18 is a pinion 31 which engages a gear wheel 32 on a cable roller 33 designed to operate the log carriage. The saw is designated *a*.

The operation of my invention may be briefly described as follows: The lever 25 is operated to move the friction wheel 24 into engagement with the pulley 10 or to push the friction wheel 24 into contact with the pulley 14 and to push said pulley 14 into contact with the friction pulley 17 on the driving shaft 2, the slots 15 in the bearing 13 permitting this movement. Whenever it is desired to adjust the shaft 18 and the friction wheel 24 carried thereby up toward the pulleys 10 and 14, the nut on the bolt 29 is tightened up, the result being that the shaft 18 is raised.

My invention is of simple construction, requires little belting to operate the same, is quick and reliable in action and is very efficient in use.

Having thus described the invention, what is claimed as new, is:—

1. The combination of a frame, a driving shaft mounted on the frame, a pulley on said shaft, a transmission shaft mounted on the frame, a pulley mounted on said shaft, a belt passing over said pulleys, a friction pulley mounted on each of said shafts, an intermediate shaft, a friction pulley on said intermediate shaft, a driven shaft mounted intermediate the driving shaft and the transmission shaft, a friction wheel carried by said driven shaft, a bar at one side of the frame, a slide secured in said frame, said driven shaft being mounted at one end in the bar and near the opposite end in said slide, a lever for moving said slide, and a bolt for adjusting the friction wheel on said driven shaft toward and from the friction pulleys on the transmission shaft and the intermediate shaft.

2. In a saw mill gearing, the combination of a frame, a driving shaft, a transmission shaft, a friction pulley on each of said shafts, a belt passing over the friction pulleys on said shafts, an intermediate shaft, a friction pulley mounted upon said shaft, a driven shaft, a friction pulley on said driven shaft, means for moving the friction pulley on the driven shaft into and out of contact with said friction pulleys on the transmission shaft and the intermediate shaft, said means comprising a slide in which the driven shaft is mounted, and a lever for moving said slide.

3. In an apparatus of the character described, the combination with a frame, a driving shaft on the frame, a driven shaft on the frame, friction pulleys on said shafts, a countershaft driven by said drive shaft, a friction pulley on said countershaft, a friction pulley between the pulleys on the driving and driven shafts, and means for shifting the driven shaft to contact the pulley on the driven shaft with either the last mentioned friction pulley or the friction pulley on the countershaft.

In testimony whereof I affix my signature in presence of two witnesses.

EMANUEL HICKMAN CHANDLER.

Witnesses:
L. H. BAGGETT,
F. F. BECKER.